No. 633,637. Patented Sept. 26, 1899.
M. G. BUNNELL.
MACHINE FOR MAKING AND REPAIRING ROADS.
(Application filed Feb. 17, 1899.)
(No Model.) 2 Sheets—Sheet 1.
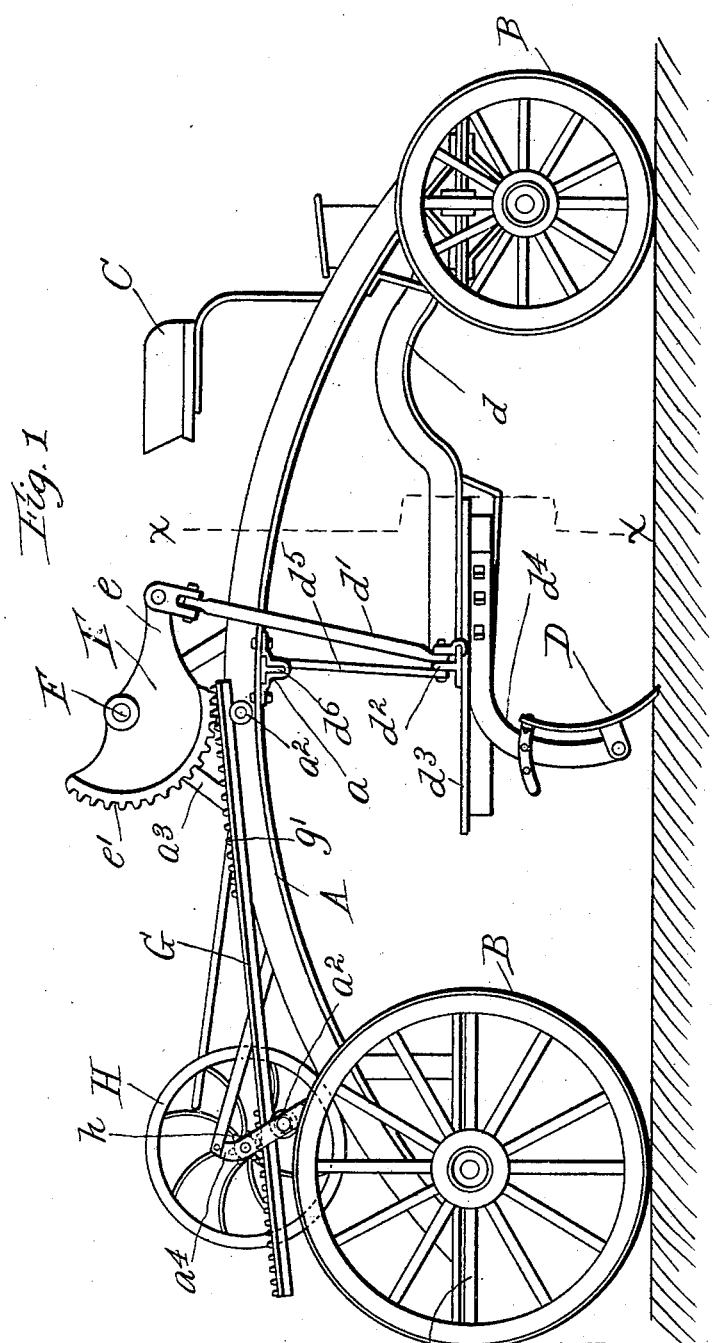

No. 633,637. Patented Sept. 26, 1899.
M. G. BUNNELL.
MACHINE FOR MAKING AND REPAIRING ROADS.
(Application filed Feb. 17, 1899.)
(No Model.) 2 Sheets—Sheet 2.
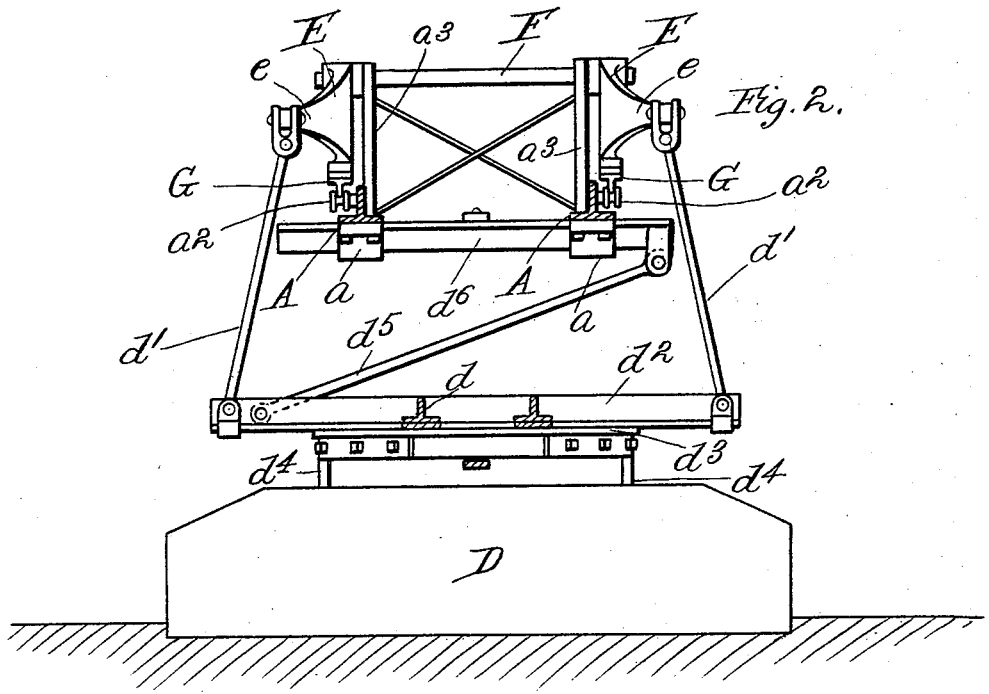
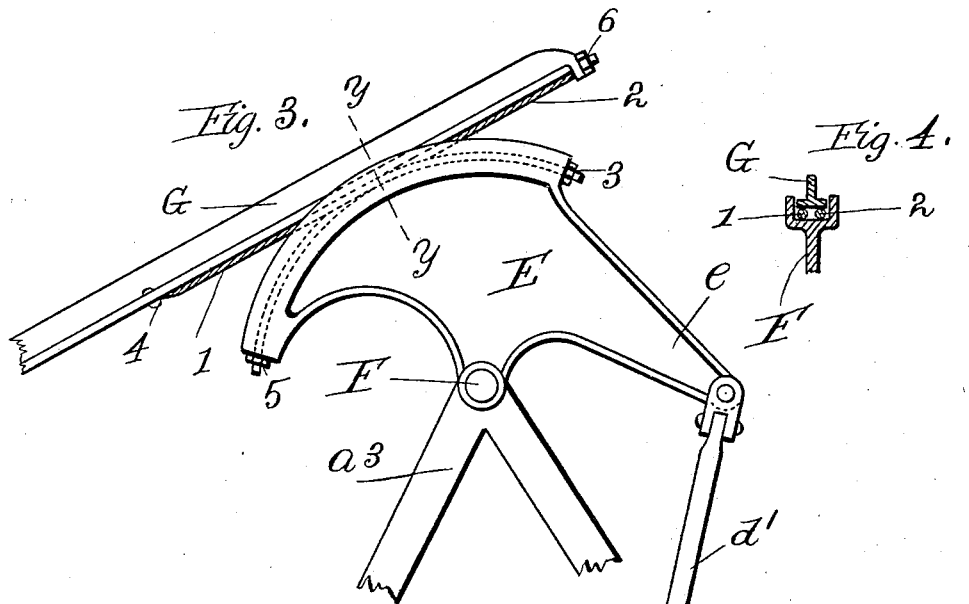
Witnesses:
A. F. Durand
Agnes A. Devine
Inventor:
Morton G. Bunnell,
by Chas. L. Page Atty

UNITED STATES PATENT OFFICE.

MORTON G. BUNNELL, OF CHICAGO, ILLINOIS, ASSIGNOR TO FREDERICK C. AUSTIN, OF SAME PLACE.

MACHINE FOR MAKING AND REPAIRING ROADS.

SPECIFICATION forming part of Letters Patent No. 633,637, dated September 26, 1899.

Application filed February 17, 1899. Serial No. 705,855. (No model.)

*To all whom it may concern:*

Be it known that I, MORTON G. BUNNELL, a citizen of the United States, residing at Chicago, in the county of Cook, State of Illinois, have invented a certain new and useful Improvement in Machines for Making and Repairing Roads, of which the following is a specification.

My invention relates to machines of the above class in which a body-frame is arranged to extend from front to rear vehicle-wheels and in which a vertically-adjustable scraper-blade is supported and arranged for work at a point about midway between the two sets of wheels, the adjustment of the blade being accomplished from a point at the rear end of the machine through the medium of a couple of longitudinally-adjustable bars.

The object of my invention is to provide improved and highly-efficient means for raising and lowering the scraper-blade at will and to permit the blade to be raised to the full extent of its vertical adjustment with a uniform application of power, or, in other words, to permit an operator standing on the rear platform of the machine to elevate the blade without employing more power for the second than for the first half of its upward movement.

To the attainment of the foregoing and other useful ends my invention consists in matters hereinafter set forth and described.

In the accompanying drawings, Figure 1 represents in side elevation a machine for making and repairing roads embodying my invention. Fig. 2 is a transverse section through the machine on line $x\,x$ in Fig. 1. Fig. 3 illustrates a modified form of segment, and Fig. 4 is a section on line $y\,y$ in Fig. 3.

The machine in connection with which I have illustrated my invention comprises a suitably-constructed body-frame A, supported by front and rear vehicle-wheels B, a driver's seat C, located at the forward end of the machine, and a scraper-blade D, having a draft connection $d$ with the forward axle and supported from the body-frame by hanger-rods $d'$.

In the construction illustrated it will be observed that the lower ends of the hanger-rods are secured to a bar $d^2$, extending transversely across the upper side of a circle-iron $d^3$, and that the scraper-blade is carried or immediately supported by a couple of downwardly-bent bars $d^4$, secured to opposite sides of the said circle-iron. To prevent undue side shift of the blade, an oblique rod $d^5$ is arranged to connect one end of the bar $d^2$ with the opposite end of a bar $d^6$, the nearly horizontal position of the rod permitting the hereinafter-described vertical adjustment of the blade, and for the purpose of securing a slight side or end adjustment of the latter the bar $d^6$ is made adjustable in bearings or guides $a$, secured to the under side of the body-frame. An operator's platform $a'$ is also preferably provided at the rear end of the machine.

The improved means for raising and lowering the scraper-blade consists, first and preferably, of a pair of segments E, arranged one at either side of the machine and to which are pivotally connected the upper ends of the hanger-rods $d'$. The said segments are mounted to turn either with or upon a short shaft or other suitable support F, which may extend transversely above the body-frame, and are provided with crank-arms $e$, to the ends of which latter are pivotally fastened the hanger-rods $d'$. A pair of substantially parallel and longitudinally-extending bars G are arranged in line with one and the other of the two segments and are arranged to extend from the latter rearwardly to a couple of hand-wheels H, located at opposite sides of the rear end of the machine, it being understood that the two sides of the machine are substantially alike and that the mechanism shown in Fig. 1 is simply duplicated at the other side of the machine. Each bar G is supported for longitudinal adjustment upon grooved rollers $a^2$, mounted on the frame, and each bar has its forward end portion adapted to engage and traverse the periphery of one of the segments, while its rear end is suitably connected with a hand-wheel. The latter connection preferably consists of a pinion $h$, secured to the hub of the hand-wheel H and adapted to engage a rack $g$, secured or formed upon the upper surface of the rear end of the bar G. This construction may, however, be varied without in any way departing from the spirit of my invention, as I do not limit myself to any particular means for securing a longitudinal adjustment of the two bars. The forward end of each bar is preferably provided with a rack $g'$, adapted to engage the teeth $e'$ on the periphery of one of the segments E; but this may also be varied, if desired—as, for instance, by adopting the device shown in Figs. 3 and 4. In these figures the periphery of the segment is channeled and a couple of ropes or flexible connectors 1 and 2 are employed to connect the segment with the bar G. The said ropes are arranged side by side in the peripheral channel of the segment, rope 1 having one end secured to the segment at 3, while its opposite end is secured to the bar at 4, and rope 2 having one end secured to the segment at 5, while its opposite end is secured to the bar at 6. With this arrangement the segment may be rocked or oscillated upon its axis by shifting or adjusting the bar longitudinally, the effect being to practically wind one rope and unwind the other, according to the direction in which the bar is shifted—that is to say, should the bar, for instance, be shifted forward the rope 2 would be unwound from the periphery of the segment, while the rope 1 would be wound thereon, and a reverse shifting of the bar would then operate to wind up rope 2 and unwind rope 1. While this latter arrangement is simple and efficient and in certain instances may be employed to advantage, I prefer to adopt a construction substantially as shown in Figs. 1 and 2. The shaft F may be supported in any suitable manner—as, for instance, by the standards $a^3$—and is preferably located at a point substantially above the scraper-blade. The hand-wheels H may also be mounted upon suitably-braced standards or uprights $a^4$ and are arranged so as to be within easy reach of the operator standing on the rear platform. To raise the scraper-blade bodily, the attendant rotates both of the hand-wheels so as to shift the bars G forward, thereby rocking or partially rotating each of the segments E in a direction to swing their arms $e$ upward, while to lower the blade the hand-wheels are rotated so as to shift the said bars in the opposite direction, thereby partially rotating the said segments in a direction to swing their arms downward. With my improved mechanism the raising of the blade is secured by a uniform application of power, whereas in certain devices heretofore employed it has required more power to complete the vertical adjustment of the blade than to start it.

What I claim as my invention is—

1. In a machine for making and repairing roads, a body-frame, a scraper-blade supported beneath the latter, a shaft located above the said blade, crank-arms suitably mounted upon the said shaft, hanger-rods connecting the scraper-blade with the said crank-arms, one or more bars extending forwardly from the rear platform of the machine to the said shaft, said bars having their forward end portions adapted to engage and traverse the peripheries of one or more power-transmitting devices mounted upon the said shaft and suitably connected with said crank-arms, and means for shifting or adjusting the said bar or bars longitudinally for the purpose of turning the said power-transmitting devices and crank-arms about their axes and thereby raising or lowering the scraper-blade at will.

2. In a machine for making and repairing roads, a scraper-blade arranged beneath the body-frame and supported by hanger-rods or the like having their upper ends pivotally connected with a pair of rocking or oscillatory segments, a pair of bars arranged to extend forward from the rear end of the machine and having their forward end portions connected with or adapted to engage the peripheries of the said segments, and means for shifting the said bars longitudinally so as to rock or oscillate the said segments about their axes and thereby permit the operator to either raise or lower the scraper-blade at will.

3. In a machine for making and repairing roads, one or more rocking or oscillatory segments suitably mounted at a point substantially above the scraper-blade, one or more bars arranged to extend forward from a platform at the rear end of the machine and having their forward end portions connected with and adapted to traverse the peripheries of the said segments, power-transmitting connection between the latter and the scraper-blade, and means for longitudinally shifting the said bar or bars for the purpose of rocking or partially rotating said segment or segments and thereby either raising or lowering the scraper-blade.

4. In a machine for making and repairing roads, a scraper-blade arranged beneath the body-frame and supported by hanger-rods pivotally connected at their upper ends to a pair of segmental gears, a pair of rack-bars arranged to extend forward from the rear end of the machine and having their forward ends in engagement with the said segmental gears, and a pair of hand-wheels gear-connected with the rear ends of the said rack-bars, whereby the latter may be shifted longitudinally for the purpose of rocking or oscillating the said segments about their axes, and the scraper-blade thereby raised or lowered at will.

MORTON G. BUNNELL.

Witnesses:
GEO. F. BRAWNER,
J. E. BROWN.